(No Model.)
G. A. BROWN.
TRACE CARRIER.
No. 486,846. Patented Nov. 29, 1892.
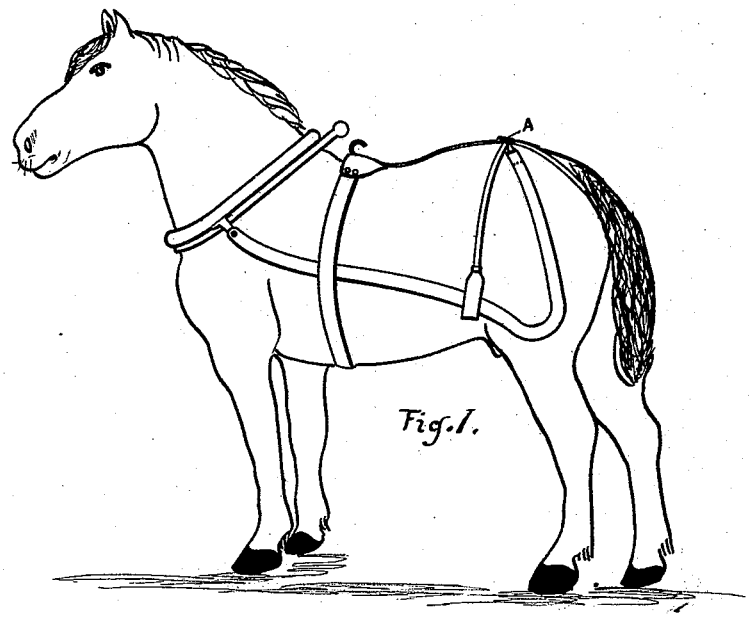
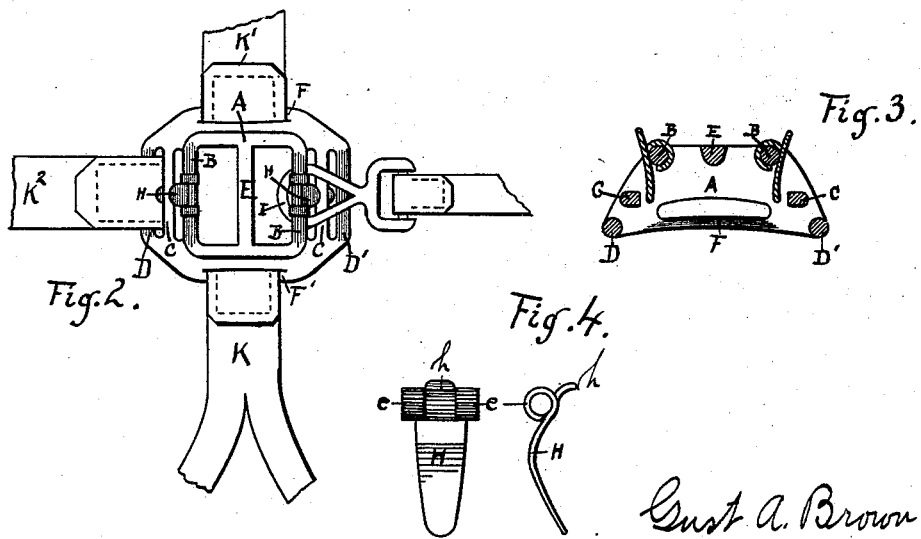
WITNESSES:
H. S. Mann
H. A. Lyman
INVENTOR
Gust. A. Brown
BY C. W. Snes.
ATTORNEY.

United States Patent Office.

GUST A. BROWN, OF MANLEY, NEBRASKA.

TRACE-CARRIER.

SPECIFICATION forming part of Letters Patent No. 486,846, dated November 29, 1892.

Application filed March 21, 1892. Serial No. 425,840. (No model.)

*To all whom it may concern:*

Be it known that I, GUST A. BROWN, of Manley, in the county of Cass and State of Nebraska, have invented certain useful Improvements in Trace-Carriers; and I do hereby declare that the following is a full, clear, and exact description of the invention, such as will enable others skilled in the art to which it appertains to make and use the same, reference being had to the accompanying drawings, which form a part of this specification.

This invention has relation to a new and novel trace-carrier, the object being to provide a device that shall be simple of construction, positive in its action, and readily operated; and in furtherance of this object the invention consists in the construction, combination, and arrangement of parts, as hereinafter more fully described, and finally pointed out in the claim.

In the accompanying drawings, Figure 1 shows my carrier as attached to a harness. Fig. 2 is a top view more clearly illustrating its connection to the harness. Fig. 3 is a sectional view thereof, while Fig. 4 shows enlarged details of the swinging dogs as employed in my device.

A represents my basket-shaped carrier-stock, of suitable metal and configuration, provided at its upper end with two cylindrical cross-bars B B, the braces C C, the lower loop-bars D D', and the upper central brace E. The stock is approximately rectangular in shape, having two solid sides, at the lower ends of which I provide the loop-bars F F', the whole stock being cast in one piece.

Swinging and supported upon the cross-bars B B are the two sheet-metal dogs H H. (Shown in Fig. 4.) These dogs are tongue-shaped, having their upper ends recurved, so as to form the ears $e$ $e$, by means of which the dogs are movably connected to the bars B B. Centrally a portion of this upper end is extended to form the thumb-piece $h$, by means of which the swinging dogs are operated. The carrier is attached to the harness by having the loop F' engaged by the crupper K, the loop F by the turn-back K', and the loops D D' by the trace-hangers, one of which $K^2$ is shown as attached in Fig. 2. Normally the dogs hang as shown in Fig. 3. Now when it is desired to secure the trace, as illustrated in Fig. 1, it is simply necessary to force the terminal trace-loop I between the opening presented between the cross-bar B and the brace C, when the dog H will be forced out of the perpendicular until its lower end rides over and into the loop I, when the trace will be positively secured. The weight of the trace drags the dog against the brace C, and is thus secured. It is impossible through any movement of the horse or harness to detach the traces. However, when it is desired to remove the loop from the carrier it is simply necessary to shove the trace-loop into the carrier, force the dog upward and out of the path of the loop, when it may be readily removed. The dog is operated by means of the thumb-piece $h$, and the whole operation of releasing or attaching the trace may be accomplished with one hand, even when the hand of the operator is incased within a mitten.

Having thus described my said invention and the best method known to me of operating the same, what I claim as new, and desire to secure by United States Letters Patent, is—

As an improved article of manufacture, the trace-carrier hereinbefore described, comprising the rectangular stock A, having two solid sides, provided at the lower ends with the loop-bars F F', the cylindrical cross-bars B B, the loop-supporting braces C C, the lower loop-bars D D', adapted to support the trace-hangers, in combination with the tongues H H, provided with the ears $e$ and the thumb-piece H, all arranged substantially as and for the purpose set forth.

In testimony whereof I affix my signature in presence of two witnesses.

GUST A. BROWN.

Witnesses:
W. B. SACKETT,
JAMES CAREY.